US009643668B2

(12) United States Patent
Zimmer et al.

(10) Patent No.: US 9,643,668 B2
(45) Date of Patent: May 9, 2017

(54) SPROCKET FOR A TRACK-TYPE MACHINE

(71) Applicant: Caterpillar Global Mining America LLC, Houston, PA (US)

(72) Inventors: Adalbert Zimmer, Meadowlands, PA (US); Estel Owens, Washington, PA (US)

(73) Assignee: Caterpillar Global Mining America LLC, Houston, PA (US)

( * ) Notice: Subject to any disclaimer, the term of this patent is extended or adjusted under 35 U.S.C. 154(b) by 48 days.

(21) Appl. No.: 14/562,322

(22) Filed: Dec. 5, 2014

(65) Prior Publication Data

US 2016/0159417 A1 Jun. 9, 2016

(51) Int. Cl.
| | |
|---|---|
| *B62D 55/12* | (2006.01) |
| *B62D 55/06* | (2006.01) |
| *B62D 55/20* | (2006.01) |
| *F16H 55/30* | (2006.01) |
| *B62D 55/14* | (2006.01) |
| *B62D 55/26* | (2006.01) |

(52) U.S. Cl.
CPC ............ *B62D 55/12* (2013.01); *B62D 55/14* (2013.01); *B62D 55/26* (2013.01); *F16H 55/30* (2013.01)

(58) Field of Classification Search
CPC ...... B62D 55/12; B62D 55/06; B62D 55/125; B62D 55/20; F16H 55/30
USPC .......................... 180/9.62; 474/152, 153, 205
See application file for complete search history.

(56) References Cited

U.S. PATENT DOCUMENTS

| | | | | | |
|---|---|---|---|---|---|
| 2,987,932 | A | * | 6/1961 | Szonn | B65G 23/06 474/153 |
| 3,996,812 | A | * | 12/1976 | Cappotto | F16H 55/171 474/153 |
| 4,553,952 | A | * | 11/1985 | Tangorra | F16G 1/28 474/153 |
| 4,634,410 | A | * | 1/1987 | Tangorra | F16H 7/023 474/153 |
| 4,850,943 | A | * | 7/1989 | DiGiacomo | F16G 1/28 428/57 |

(Continued)

FOREIGN PATENT DOCUMENTS

| | | |
|---|---|---|
| JP | 2002-308160 A | 10/2002 |
| WO | WO 2011/030994 A1 | 3/2011 |

OTHER PUBLICATIONS

U.S. Patent Application of Adalbert Zimmer entitled "Idler Wheel for a Track-Type Machine," filed on Dec. 5, 2014.

(Continued)

*Primary Examiner* — Jacob Knutson

(57) ABSTRACT

A sprocket is disclosed. The sprocket may have a cylindrical hub having a first hub end and a second hub end disposed opposite the first hub end. The sprocket may also have a sprocket wheel disposed on the cylindrical hub between the first hub end and the second hub end. The sprocket may further have at least one tooth disposed on the sprocket wheel. The at least one tooth may have a tooth bottom disposed on a root circle. The at least one tooth may also have a tooth flank extending radially outward from the root circle to an outer surface of the at least one tooth. In addition, the at least one tooth may have a flat extending from the tooth bottom at a generally obtuse angle relative to a radial axis of the at least one tooth.

18 Claims, 12 Drawing Sheets

(56) References Cited

U.S. PATENT DOCUMENTS

| | | | |
|---|---|---|---|
| 5,046,993 A * | 9/1991 | Macchiarulo | F16H 7/023 474/205 |
| 5,102,374 A * | 4/1992 | Macchiarulo | F16H 7/023 474/153 |
| 5,161,866 A | 11/1992 | Johnson | |
| 5,533,587 A * | 7/1996 | Dow | B62D 55/244 180/235 |
| 6,527,347 B2 | 3/2003 | Brawley et al. | |
| 7,222,924 B2 * | 5/2007 | Christianson | B62D 55/10 305/125 |
| 7,497,530 B2 | 3/2009 | Bessette | |
| 7,673,951 B2 | 3/2010 | Chiang | |
| 8,070,240 B2 | 12/2011 | Zheng et al. | |
| 2012/0146398 A1 | 6/2012 | Nebergall et al. | |
| 2014/0001825 A1 | 1/2014 | Hakes | |

OTHER PUBLICATIONS

U.S. Patent Application of Adalbert Zimmer entitled "Upper Transition Assembly for a Track-Type Machine," filed on Dec. 5, 2014.
U.S. Patent Application of Adalbert Zimmer entitled "Wear Shoe Assembly for a Track-Type Machine," filed on Dec. 5, 2014.

* cited by examiner

SPROCKET FOR A TRACK-TYPE MACHINE

TECHNICAL FIELD

The present disclosure relates generally to a sprocket and, more particularly, to a sprocket for a track-type machine.

BACKGROUND

Earth-working machines, for example, excavators, continuous miners, loaders, often include tracked undercarriages that facilitate movement of the machines over ground surfaces. Such track-type machines typically include tracks located on either side of the machine. Each track includes a chain having links pinned end-to-end forming a loop that extends around a drive sprocket at one end of the chain and an idler wheel located at the other end of the chain. Some machines may include additional idler wheels to guide the chain from the sprocket end to the idler wheel end. The chains often also include ground engaging track shoes connected to adjacent pairs of links. An engine associated with the machine typically drives the sprocket. Teeth on the sprocket engage with the links to rotate the chain, pushing the track shoes against a work surface and allowing the machine to be propelled in a forward or rearward direction.

Repeated contact between the sprocket teeth and the links causes the teeth and the links to wear over time, creating slack in the chains between the sprocket and the one or more idler wheels. Slack in the chains can cause the chains to wear excessively, break, or to slip off the drive sprocket and idler wheels. Repairing broken or displaced chains may require expensive and labor intensive service operations, which can place the machine out of service for a long time. Thus, minimizing wear of the sprocket teeth and track shoes becomes important to reduce excessive slack formation and to prevent premature failure of the chains.

U.S. Pat. No. 8,070,240 of Zheng et al. that issued on Dec. 6, 2011 discloses a sprocketed drive assembly for a track-type machine. In particular, the '240 patent discloses a sprocket assembly having a plurality of teeth, where each successive pair of teeth defines a substantially concave channel for receiving a cylindrical pin member associated with a link member of a continuous track chain. The '240 patent further discloses that each tooth has a tooth angle of about 17 degrees measured between a flat portion of a tooth flank and a radial axis passing midway between adjacent teeth. The '240 patent discloses that decreasing the tooth angle of the drive sprocket makes the sprocket teeth steeper, which increases the rotational force needed for the chain to slip or jump over the steeper tooth angle, potentially limiting the occurrence of sudden track movement also known as "track jump."

Although the '240 patent discloses a sprocket designed to reduce track jump, the disclosed sprocket may still be less than optimal. In particular, the use of a concave channel between adjacent teeth may cause the link member engaged by a tooth to have a line contact with the tooth flank. Line contact between the link member and the tooth may have the effect of concentrating the contact force over a relatively small surface area of the tooth, which may increase the amount of wear experienced by the tooth and the link member, contributing to generation of slack in the track chain.

The sprocket of the present disclosure solves one or more of the problems set forth above and/or other problems of the prior art.

SUMMARY

In one aspect, the present disclosure is directed to a sprocket. The sprocket may include a cylindrical hub having a first hub end and a second hub end disposed opposite the first hub end. The sprocket may also include a sprocket wheel disposed on the cylindrical hub between the first hub end and the second hub end. The sprocket may further include at least one tooth disposed on the sprocket wheel. The at least one tooth may include a tooth bottom disposed on a root circle. The at least one tooth may also include a tooth flank extending radially outward from the root circle to an outer surface of the at least one tooth. In addition, the at least one tooth may include a flat extending from the tooth bottom at a generally obtuse angle relative to a radial axis of the at least one tooth.

In another aspect, the present disclosure is directed to a track assembly. The track assembly may include a plurality of link members forming a track chain. The track assembly may also include an idler wheel disposed at front end of the track chain. Further, the track assembly may include a sprocket disposed at a rear end of the track chain opposite the front end. The sprocket may be configured to propel the track chain. The sprocket may include a sprocket wheel. The sprocket may also include at least one tooth disposed on the sprocket wheel. The at least one tooth may include a tooth bottom disposed on a root circle. The at least one tooth may also include a tooth flank extending radially outward from the root circle to an outer surface of the at least one tooth. In addition, the at least one tooth may include a flat extending from the tooth bottom at a generally obtuse angle relative to a radial axis of the at least one tooth.

In yet another aspect, the present disclosure is directed to a machine. The machine may include a frame. The machine may also include an engine supported by the frame. The machine may further include a plurality of link members forming a track chain. The machine may also include an idler wheel attached to the frame. The idler wheel may be disposed at a front end of the track chain. The machine may further include a sprocket attached to the frame. The sprocket may be disposed at a rear end of the track chain opposite the front end. The sprocket may be configured to be driven by the engine. The machine may also include a plurality of teeth disposed on the sprocket. Each tooth may include a first tooth bottom disposed on a root circle. The tooth may also include a second tooth bottom disposed on the root circle. The second tooth bottom may be spaced apart from the first tooth bottom. The tooth may further include a tooth flank extending radially outward from the root circle to an outer surface of the tooth. The tooth may also include a first flat extending from the first tooth bottom at a first generally obtuse angle relative to a radial axis of the at least one tooth. In addition the tooth may include a second flat extending from the second tooth bottom at a second generally obtuse angle relative to the radial axis.

DETAILED DESCRIPTION

Figure 1:
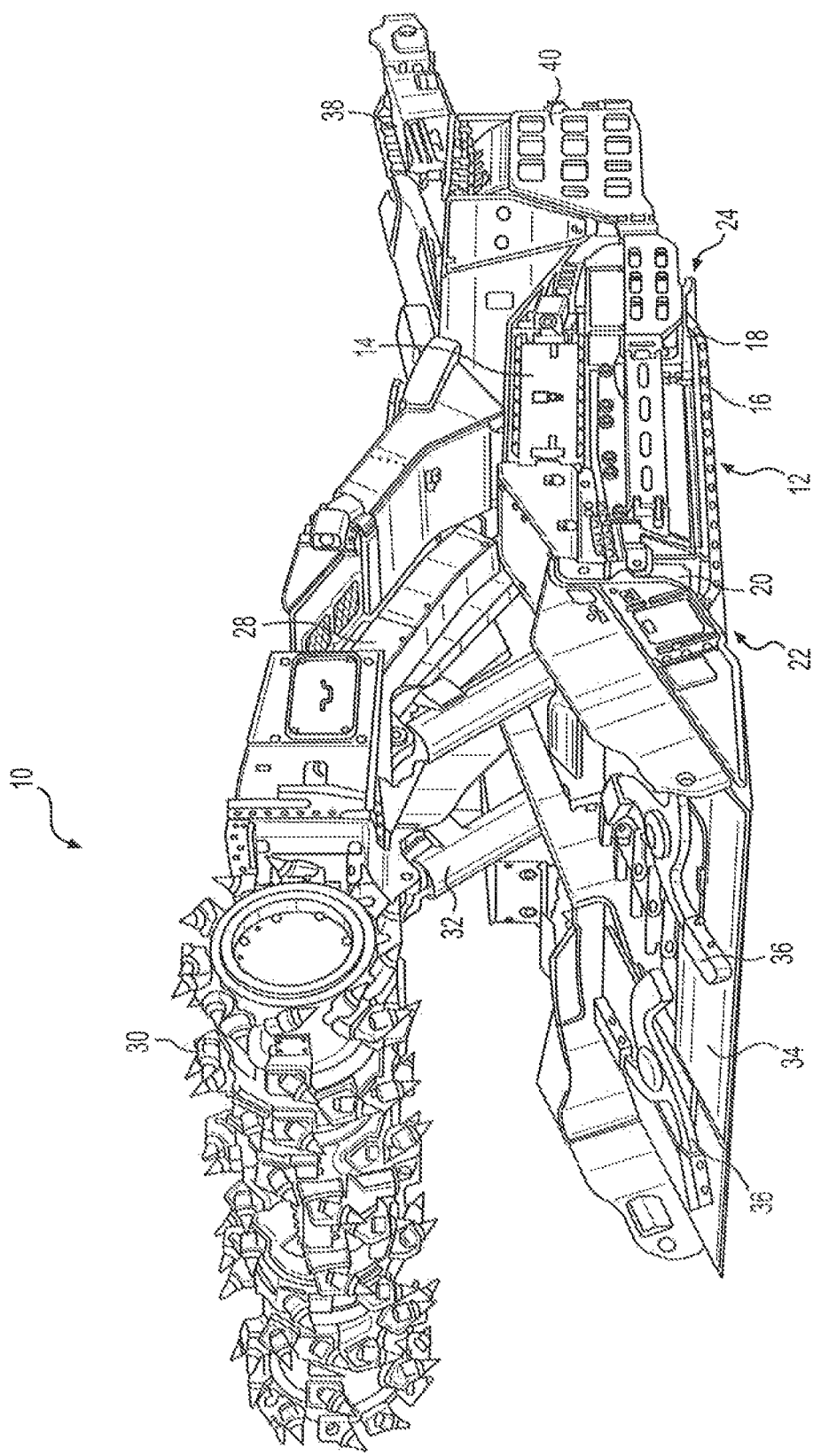
FIG. 1 is a pictorial illustration of an exemplary disclosed machine.

FIG. 1 illustrates an exemplary embodiment of a machine 10 having a track assembly 12 on each side of machine 10. Machine 10 may perform some type of operation associated with an industry such as mining, construction, or another industry known in the art. For example, as illustrated in FIG. 1, machine 10 may be a continuous mining machine designed to cut and transport mining materials from an underground mine. It is contemplated, however, that machine 10 may be a loader, a tractor, an excavator, a tank, or another mobile machine having track-type traction devices. Machine 10 may have a frame 14, which may support one or more track assemblies 12. Each track assembly 12 may include a track chain 16, a sprocket assembly 18 and an idler assembly 20. In one exemplary embodiment, as illustrated in FIG. 1, idler assembly 20 may be located adjacent front end 22 of track chain 16 and sprocket assembly 18 may be located adjacent rear end 24 of track chain 16.

Machine 10 may include a boom 28 to support one or more work tools 30. In one exemplary embodiment, as illustrated in FIG. 1, work tools 30 may be cutter wheels configured to scrape or cut mining materials. Machine 10 may include one or more hydraulic, pneumatic, or electromechanical actuators 32 configured to raise or lower boom 28. Machine 10 may also include a gathering head 34, which may be equipped with one or more loading arms 36. Loading arms 36 may rotate to help push mining materials in gathering head 34 to a conveyor 38 configured to transport the materials away from machine 10. Gathering head 34 may also be equipped with one or more hydraulic, pneumatic, or electro-mechanical actuators (not shown) configured to move gathering head 34 upward, downward, or sideways.

Machine 10 may also include an engine 40, which may generate a power output that can be directed through sprocket assembly 18 and track chain 16 to propel machine 10 in a forward or rearward direction. Engine 40 may be any suitable type of internal combustion engine, such as a gasoline, diesel, natural gas, or hybrid-powered engine. It is also contemplated, however, that engine 40 may be a power source driven by electricity. For example, engine 40 may be driven by 1000 W of electrical power. Engine 40 may be configured to deliver power output directly to sprocket assembly 18. Additionally or alternatively, engine 40 may be configured to deliver power output to a generator (not shown), which may in turn drive one or more electric motors (not shown) coupled to sprocket assembly 18. According to yet another embodiment, engine 40 may deliver power output to a hydraulic motor (not shown) fluidly coupled to a hydraulic pump (not shown) and configured to convert a fluid pressurized by the pump into a torque output, which may be directed to sprocket assembly 18. Engine 40 may also supply mechanical, electrical, or hydraulic power to help raise or lower boom 28 via actuators 32, move gathering head 34, drive conveyor 38, and/or help drive work tools 30 during operation of machine 10.

Figure 2:
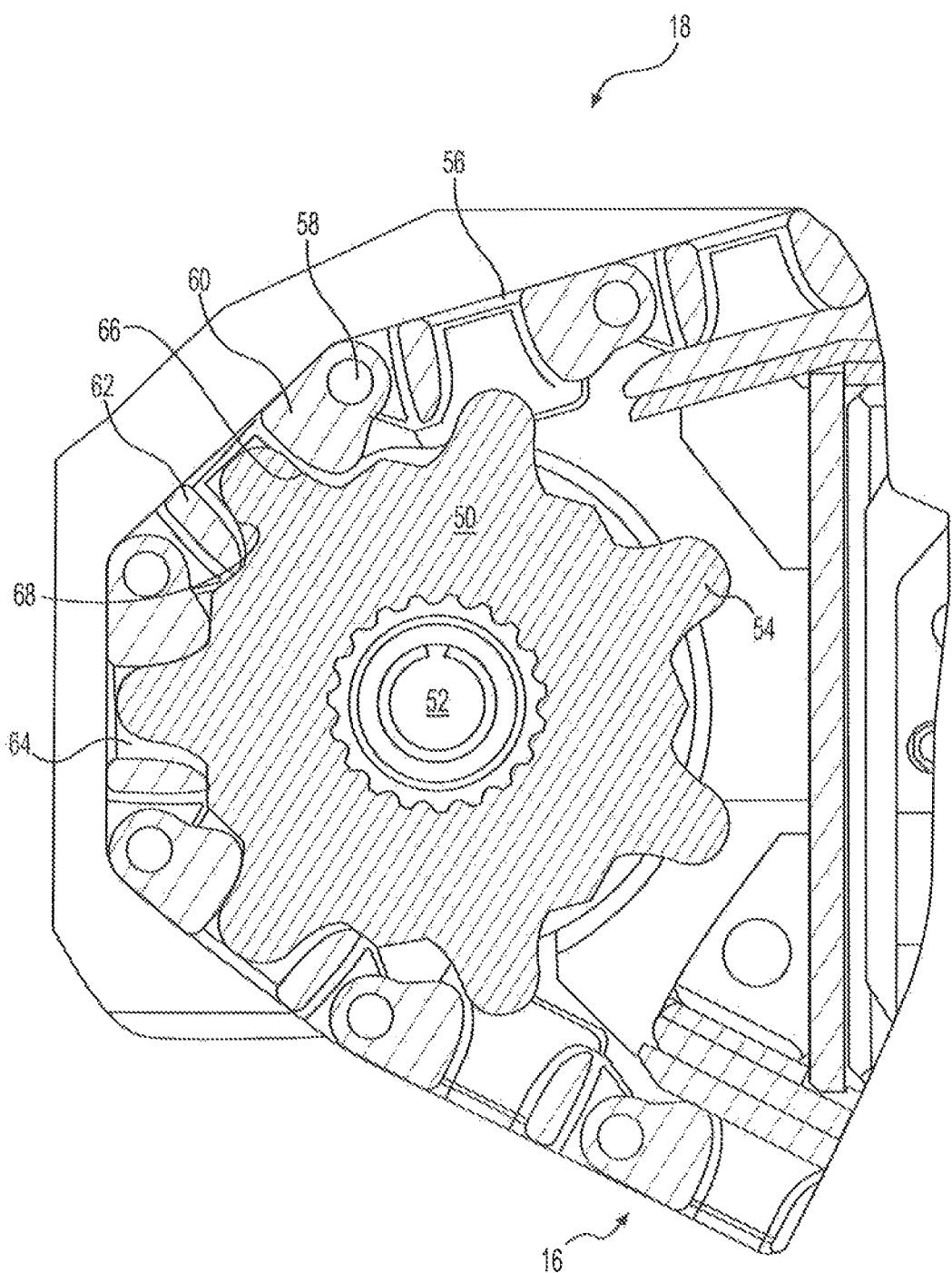
FIG. 2 is a cut-away view of an exemplary disclosed sprocket assembly for the machine of FIG. 1.

FIG. 2 illustrates a cut away view of an exemplary embodiment of sprocket assembly 18 for machine 10. Sprocket assembly 18 may include sprocket 50 and sprocket shaft 52. It is contemplated that sprocket assembly 18 may include additional and/or different components than those listed above. For example, sprocket assembly 18 may also gear trains, seals, bearings etc. that may cooperate to transfer the power output generated by engine 40 to sprocket 50.

Sprocket 50 may be coupled to sprocket shaft 52, which may be configured to deliver a torque output to sprocket 50 based on the power output generated by engine 40. For example, sprocket 50 may be secured (e.g., welded, bolted, heat-coupled, keyed, etc.) to sprocket shaft 52, so that sprocket 50 may rotate in response to the torque output delivered by sprocket shaft 52. In one exemplary embodiment, sprocket 50 may be directly coupled via sprocket shaft 52 to engine 40. In another exemplary embodiment, sprocket 50 may be coupled to engine 40 via a torque converter (such as a gearbox, transmission, etc.), so that rotation of sprocket 50 is proportional to the torque generated by engine 40.

Sprocket 50 may include a plurality of alternating teeth 54, which may be configured to engage a portion of track chain 16 such that a rotational force applied to sprocket 50 may be delivered to track chain 16. As illustrated in FIG. 2, track chain 16 may include a plurality of link members 56 coupled together to form an endless track chain 16. For example, adjacent (e.g. consecutive) link members 56 may be coupled together via pivot members 58. Each link member 56 may include a front pad 60, a rear pad 62, and a recess 64 disposed between front and rear pads 60, 62. Tooth 54 of sprocket 50 may be disposed in recess 64 between front pad 60 and rear pad 62 of link member 56. Leading edge 66 of tooth 54 may be configured to come into contact with front pad 60 when sprocket 50 rotates in a clockwise direction, for example, when machine 10 is propelled in a forward direction. Trailing edge 68 of tooth 54 may be configured to come into contact with rear pad 62 when sprocket 50 rotates in a counter-clockwise direction, for example, when machine 10 is propelled in a rearward direction.

Figure 3:
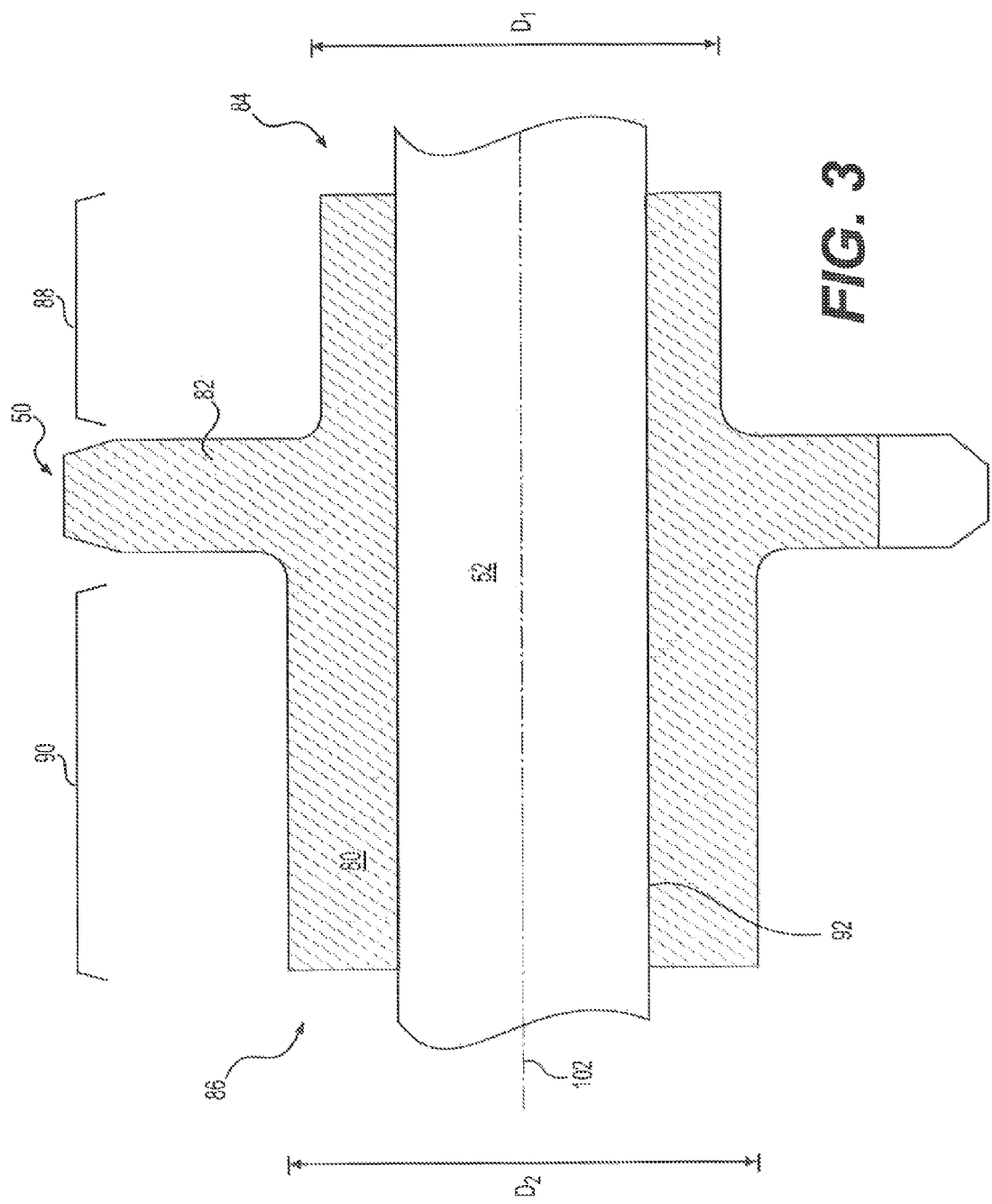
FIG. 3 is a cut-away view of an exemplary disclosed sprocket for the sprocket assembly of FIG. 2.

FIG. 3 illustrates a cut-away view of an exemplary embodiment of sprocket 50. As illustrated in FIG. 3, sprocket 50 may include a hub 80 and a sprocket wheel 82. Hub 80 may have a generally cylindrical shape. In one exemplary embodiment, hub 80 and sprocket wheel 82 may form an integral sprocket 50. For example, sprocket 50, including hub 80 and sprocket wheel 82 may be a forged or cast piece of metal. In another exemplary embodiment, sprocket wheel 82 may be separate from hub 80 and may be attached to hub 80 via an interference fit, welded joint, keyed joint, or by any other type of attachment known in the art.

Hub 80 may extend from a first hub end 84 to a second hub end 86 opposite first hub end 84. Sprocket wheel 82 may be disposed between first hub end 84 and second hub end 86. In one exemplary embodiment, as illustrated in FIG. 3, sprocket wheel 82 may be disposed nearer first hub end 84 as compared to second hub end 86. Hub 80 may have a first hub portion 88 extending from first hub end 84 to sprocket wheel 82 and a second hub portion 90 extending from sprocket wheel 82 to second hub end 86. First hub portion 88 may have a first outer hub diameter "$D_1$" and second hub portion 90 may have a second outer hub diameter "$D_2$,"

which may be the same as or different from the first outer hub diameter $D_1$. Hub 80 may also include a bore 92 extending from first hub end 84 to second hub end 86. In one exemplary embodiment, bore 92 may be cylindrical and may be configured to receive sprocket shaft 52. Sprocket shaft 52 may be attached to hub 80 via interference fit. Additionally or alternatively, sprocket shaft 52 may be attached to hub 80 via a keyed joint. It is also contemplated that sprocket shaft 52 may be attached to hub 80 via a welded joint, via fasteners, or by any other type of attachment known in the art. Although FIG. 3 illustrates sprocket 50 having only one sprocket wheel 82, it is contemplated that sprocket 50 may have any number of sprocket wheels 82.

Figure 4:
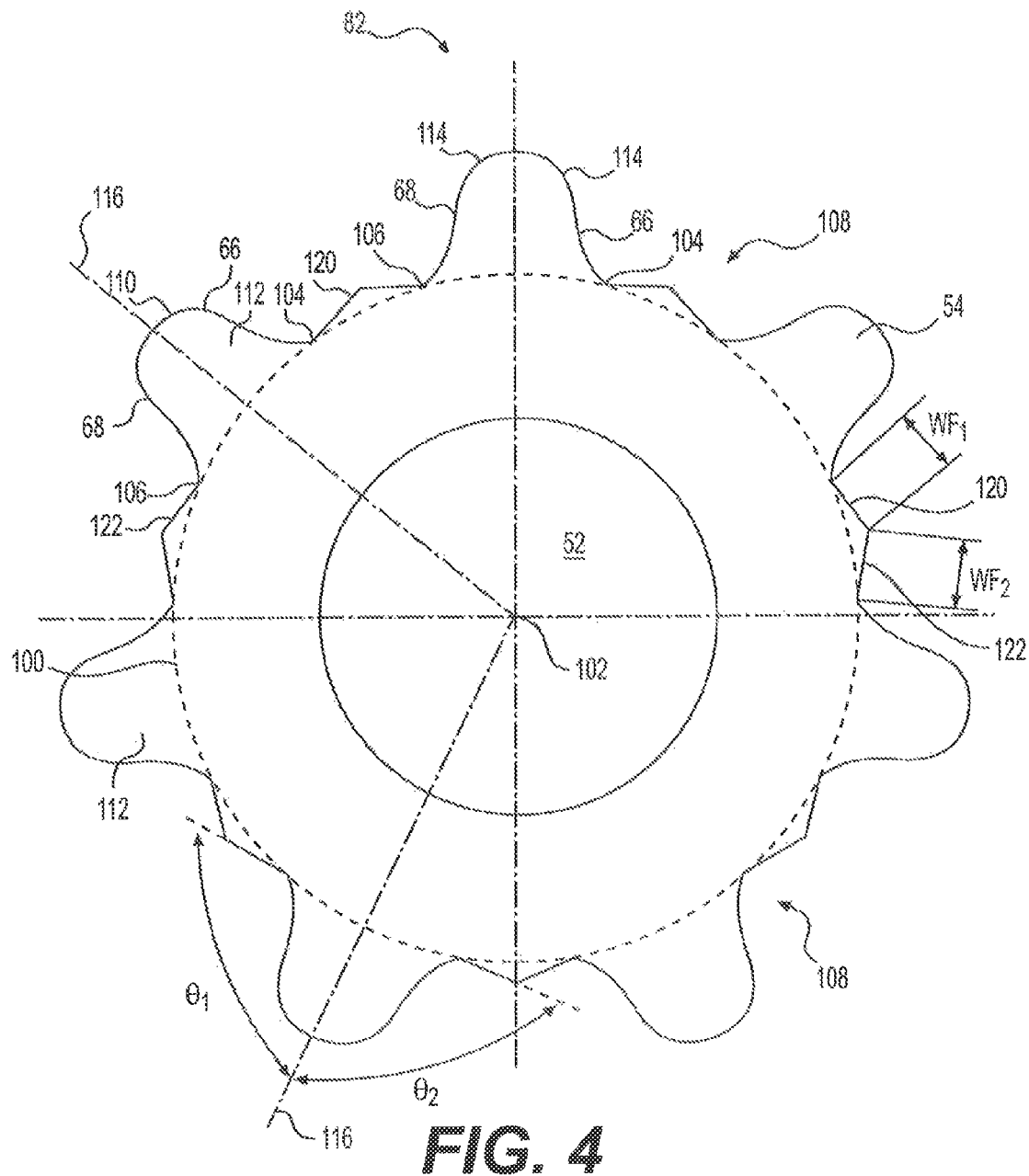
FIG. 4 is a pictorial illustration of an exemplary disclosed sprocket wheel for the sprocket of FIG. 3.

FIG. 4 illustrates a pictorial view of an exemplary embodiment of sprocket wheel 82. Sprocket wheel 82 may have a plurality of teeth 54 disposed on sprocket wheel 82. In one exemplary embodiment, as illustrated in FIG. 4, sprocket wheel 82 may have seven teeth. It is contemplated, however, that sprocket wheel 82 may have any number of teeth 54. Each tooth 54 may have a first tooth bottom 104 and a second tooth bottom 106 spaced apart from the first tooth bottom 106. Tooth 54 may extend radially outward from a root circle 100 centered on the central axis 102 of sprocket 50 and tangentially intersecting first and second tooth bottoms 104, 106 in recesses 108 in between adjacent teeth 54. Tooth 54 may have a tooth outer surface 110 located at an outermost diameter of sprocket wheel 82. Tooth 54 may also have a tooth flank 112 extending radially outward from root circle 100 to tooth outer surface 110. Tooth flank 112 may include leading edge 66 and trailing edge 68 disposed opposite leading edge 66. Leading edge 66 may extend from first tooth bottom 104 on root circle 100 to tooth outer surface 110. Trailing edge 68 may extend from second root bottom on root circle 100 to tooth outer surface 110. Leading edge 66 and trailing edge 68 of tooth 54 may each have a curvilinear shape. Further, as illustrated in FIG. 4, transition 114 between leading edge 66 and tooth outer surface 110 and between trailing edge 68 and tooth outer surface 110 may have a curved shape. Tooth outer surface 110 may be generally flat and may be disposed generally orthogonally to a radial axis 116 of tooth 54. In one exemplary embodiment, as illustrated in FIG. 4, radial axis 116 may divide tooth flank 112 into two substantially equal half portions.

Tooth 54 may include a first flat 120, which may extend from first tooth bottom 104 on root circle 100. First flat 120 may have a generally flat surface, which may be disposed at an angle $\theta_1$ relative to radial axis 116 of tooth 54. Tooth 54 may also include a second flat 122, which may extend from second tooth bottom 106 on root circle 100. Second flat 122 may have a generally flat surface, which may be disposed at an angle $\theta_2$ relative to radial axis 116 of tooth 54. Angles $\theta_1$ and $\theta_2$ may be equal or unequal. In one exemplary embodiment, angles $\theta_1$ and $\theta_2$ may be obtuse angles. In another exemplary embodiment, angles $\theta_1$ and $\theta_2$ may be about 91.5°. Thus, for example, angles $\theta_1$ and $\theta_2$ may range between 91° and 92°. First flat 120 may have a first width "$WF_1$." Second flat 122 may have a second width "$WF_2$," which may be the same as or different from width $WF_1$. First flat 120 and second flat 122 may intersect with each other, forming an inverted V-shaped surface in recesses 108 between adjacent teeth 54.

Returning to FIG. 2, the curvilinear shape of leading edge may help ensure that leading edge 66 of tooth 54 engages front pad 60 over a relatively wider surface area defined by leading edge 66 as opposed to by a line contact when sprocket 50 rotates in a clockwise direction. Similarly the curvilinear shapes of trailing edge 68 may help ensure that trailing edge 68 of tooth 54 engages rear pad 62 over a relatively wider surface area defined by trailing edge 68 as opposed to by a line contact when sprocket 50 rotates in a counter-clockwise direction. Further, disposing the first and second flats 120, 122 at obtuse angles $\theta_1$ and $\theta_2$ may help ensure that front pad 60 and/or rear pad 62 engages with first and/or second flats 120, 122, respectively, over a relatively wider surface area of contact as opposed to by a line contact. Increasing the surface area of contact may help distribute the contact force exerted on teeth 54 of sprocket wheel 82 during operation of machine 10. Distributing the contact force in this manner may help reduce an amount of wear of teeth 54, first and second flats 120, 122, and front and rear pads 60, 62, helping to reduce generation of slack in track chain 16.

Figure 5:
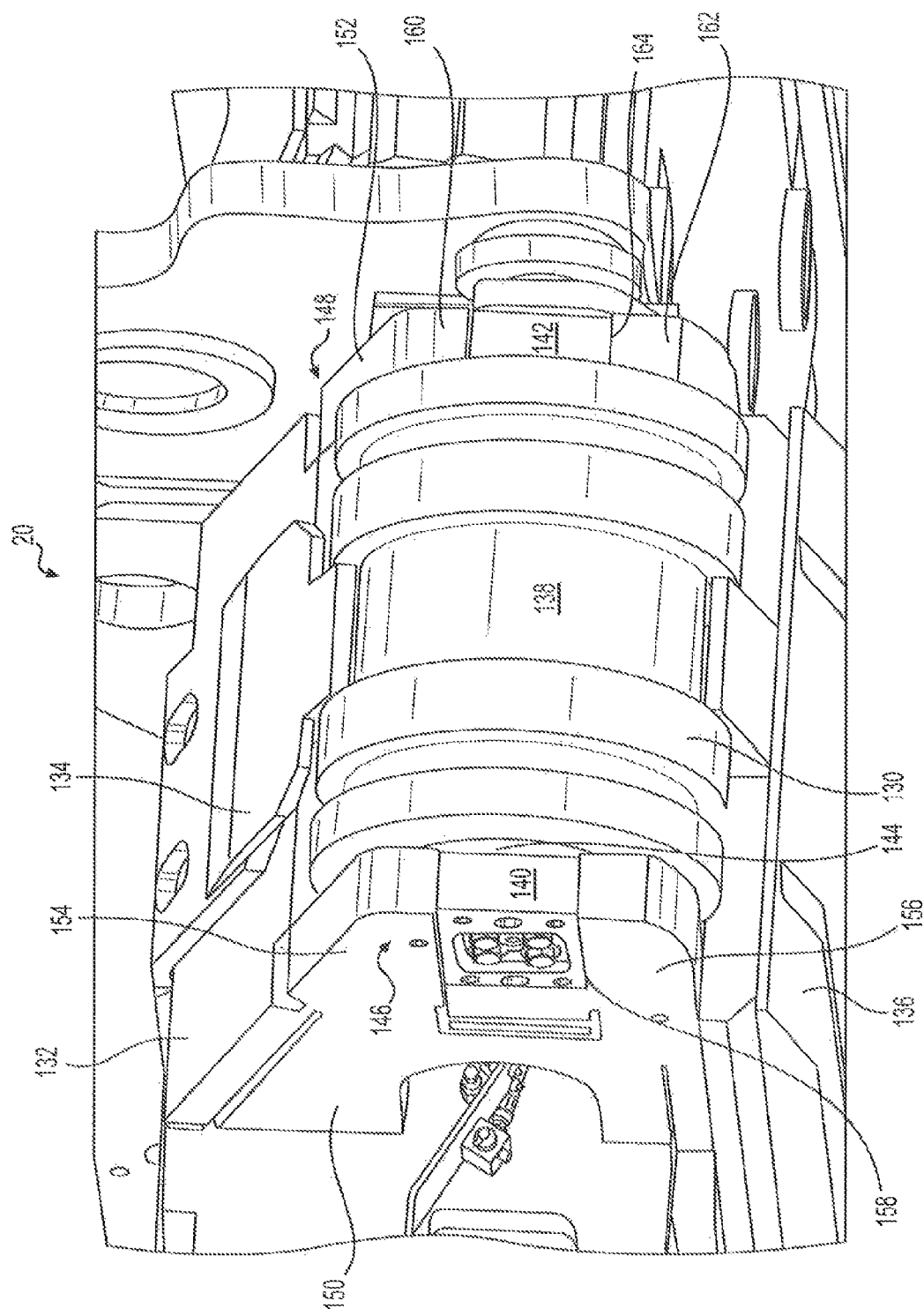
FIG. 5 is a pictorial illustration of an exemplary disclosed idler assembly for the machine of FIG. 1.

FIG. 5 illustrates a pictorial view of an exemplary embodiment of idler assembly 20. Idler assembly 20 may include idler wheel assembly 130, yoke 132, upper transition assembly 134, and wear shoe assembly 136. It is contemplated, however, that idler assembly 20 may include additional and/or different components than those listed above. For example, idler assembly 20 may also include bolts, O-rings, seals, roller bearings, etc. As also illustrated in FIG. 5, idler assembly 20 may include idler wheel 138, first slide block 140, second slide block 142, and idler shaft 144. First slide block 140 may be attached to idler shaft 144 adjacent first idler wheel end 146. Second slide block 142 may be attached to idler shaft 144 adjacent second idler wheel end 148 opposite first idler wheel end 146. First and second slide blocks 140, 142 may each have a generally square or rectangular shape. It is contemplated, however, that first and second slide blocks 140, 142 may have a triangular, polygonal, or any other type of shape known in the art. First and second slide blocks 140, 142 may engage with yoke 132 to attach idler assembly 20 to machine 10.

Yoke 132 may include a first yoke member 150 and a second yoke member 152. First yoke member 150 may have a first arm 154 and a second arm 156 spaced apart from first arm 154 to define a first slot 158. Second yoke member 152 may have a third arm 160 and a fourth arm 162 spaced apart from third arm 160 to define a second slot 164. First slide block 140 may slidingly engage with first slot 158 in first yoke member 150. Second slide block 142 may slidingly engage with second slot 164 in second yoke member 152. First and second slots 158, 164 may have a generally rectangular shape.

Figure 6:
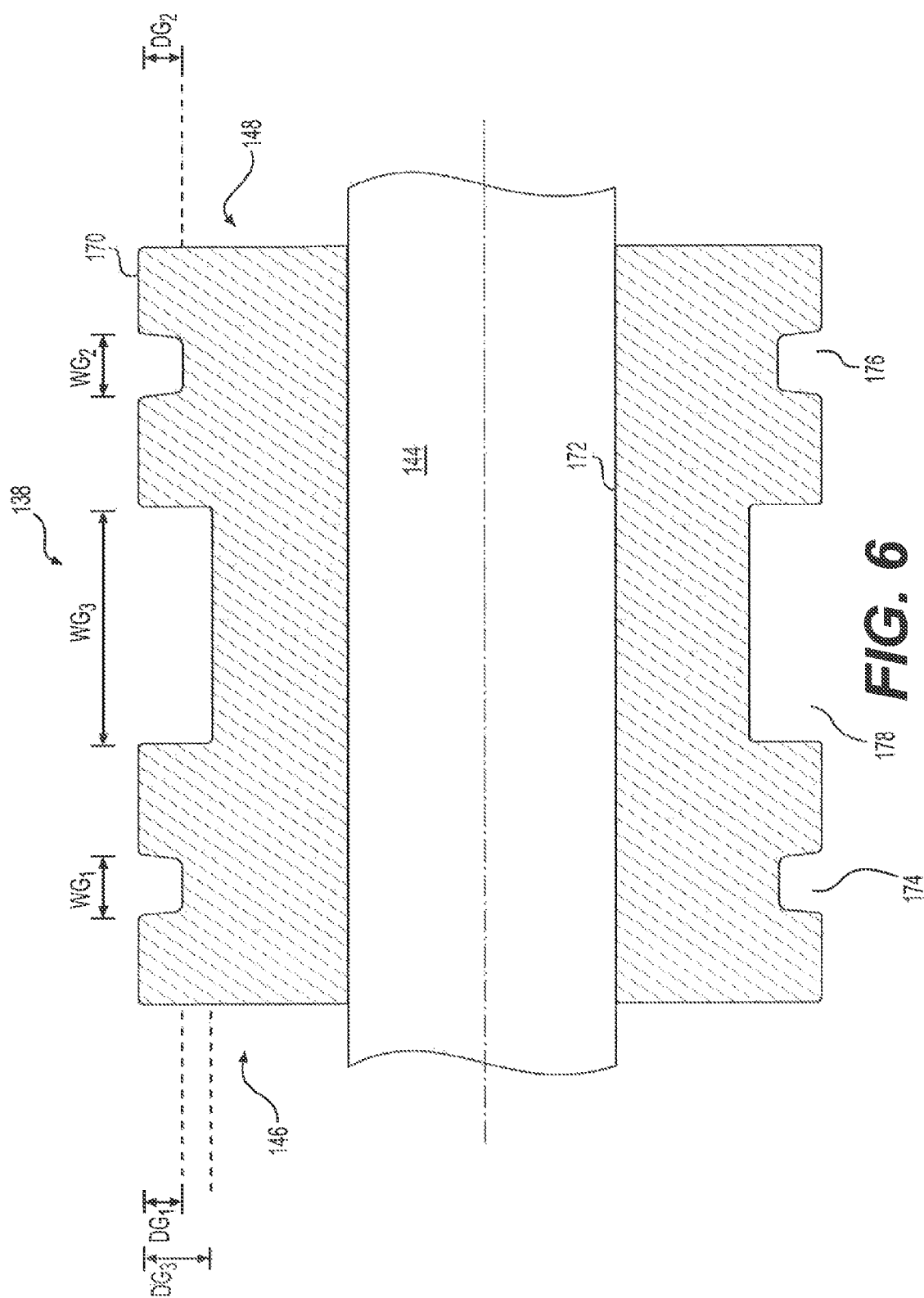
FIG. 6 is a cut-away view of an exemplary disclosed idler wheel for the idler assembly of FIG. 5.

FIG. 6 illustrates a cut-away view of an exemplary embodiment of idler wheel 138. In one exemplary embodiment, idler wheel 138 may be a forged or cast piece of metal. As illustrated in FIG. 6, idler wheel 138 may have a generally cylindrical outer surface 170, which may extend from first idler wheel end 146 to second idler wheel end 148. Idler wheel 138 may also include a generally cylindrical idler wheel bore 172, which may be configured to receive an idler shaft 144. Idler shaft 144 may be attached to idler wheel 138 via interference fit. Additionally or alternatively, idler shaft 144 may be attached to idler wheel 138 via a keyed joint. It is also contemplated that idler shaft 144 may be attached to idler wheel 138 via a welded joint, via fasteners, or by any other type of attachment known in the art.

Idler wheel 138 may have a first circumferential groove 174 disposed on outer surface 170. First circumferential groove 174 may be disposed adjacent first idler wheel end 146. In one exemplary embodiment, first circumferential groove 174 may be disposed nearer first idler wheel end 146 compared to second idler wheel end 148. Idler wheel 138 may have a second circumferential groove 176 disposed on outer surface 170. Second circumferential groove 176 may be disposed adjacent second idler wheel end 148. In one exemplary embodiment, second circumferential groove 176 may be disposed nearer second idler wheel end 148 compared to first idler wheel end 146. Idler wheel 138 may also include a third circumferential groove 178 disposed in between first circumferential groove 174 and second circumferential groove 176. In one exemplary embodiment third circumferential groove 178 may be disposed equidistant from first and second circumferential grooves 174, 176. First, second, and third circumferential grooves 174, 176, 178 may have a rectangular, semi-circular, polygonal or any other type of shape known in the art.

First circumferential groove 174 may have a first width "$WG_1$," and second circumferential groove 176 may have a second width "$WG_2$." First width $WG_1$ may be the same as or different from second width $WG_2$. In one exemplary embodiment, first width $WG_1$ may be equal to second width $WG_2$. First and second widths $WG_1$, $WG_2$ may be configured to slidingly receive rails 180 (see FIG. 7) of link members 56 (see FIG. 7). Third circumferential groove 178 may have a third width "$WG_3$," which may be the same as or different from first and/or second widths $WG_1$, $WG_2$. Third circumferential groove 178 may be configured to slidingly receive a portion of upper transition assembly 134 (see FIG. 5). In one exemplary embodiment, third width $WG_3$ may be larger than first and/or second widths $WG_1$, $WG_2$.

First circumferential groove 174 may have a first depth "$DG_1$," and second circumferential groove 176 may have a second depth "$DG_2$." First depth $DG_1$ may be the same as or different from second depth $DG_2$. In one exemplary embodiment, first depth $DG_1$ may be equal to second depth $DG_2$. Third circumferential groove 178 may have a third depth "$DG_3$" which may be the same as or different from first and/or second depths $DG_1$, $DG_2$. In one exemplary embodiment, third depth $DG_3$ may be larger than first and/or second depths $DG_1$, $DG_2$. Although FIGS. 5 and 6 illustrate only one each of first, second, and third circumferential grooves 174, 176, 178, it is contemplated that idler wheel 138 may have any number of first, second, and third circumferential grooves 174, 176, 178. It is also contemplated that idler wheel 138 may have only first circumferential groove 174, only second circumferential groove 176, only third circumferential groove 178, or any combination of one or more of first, second, and third circumferential grooves 174, 176, 178.

Figure 7:
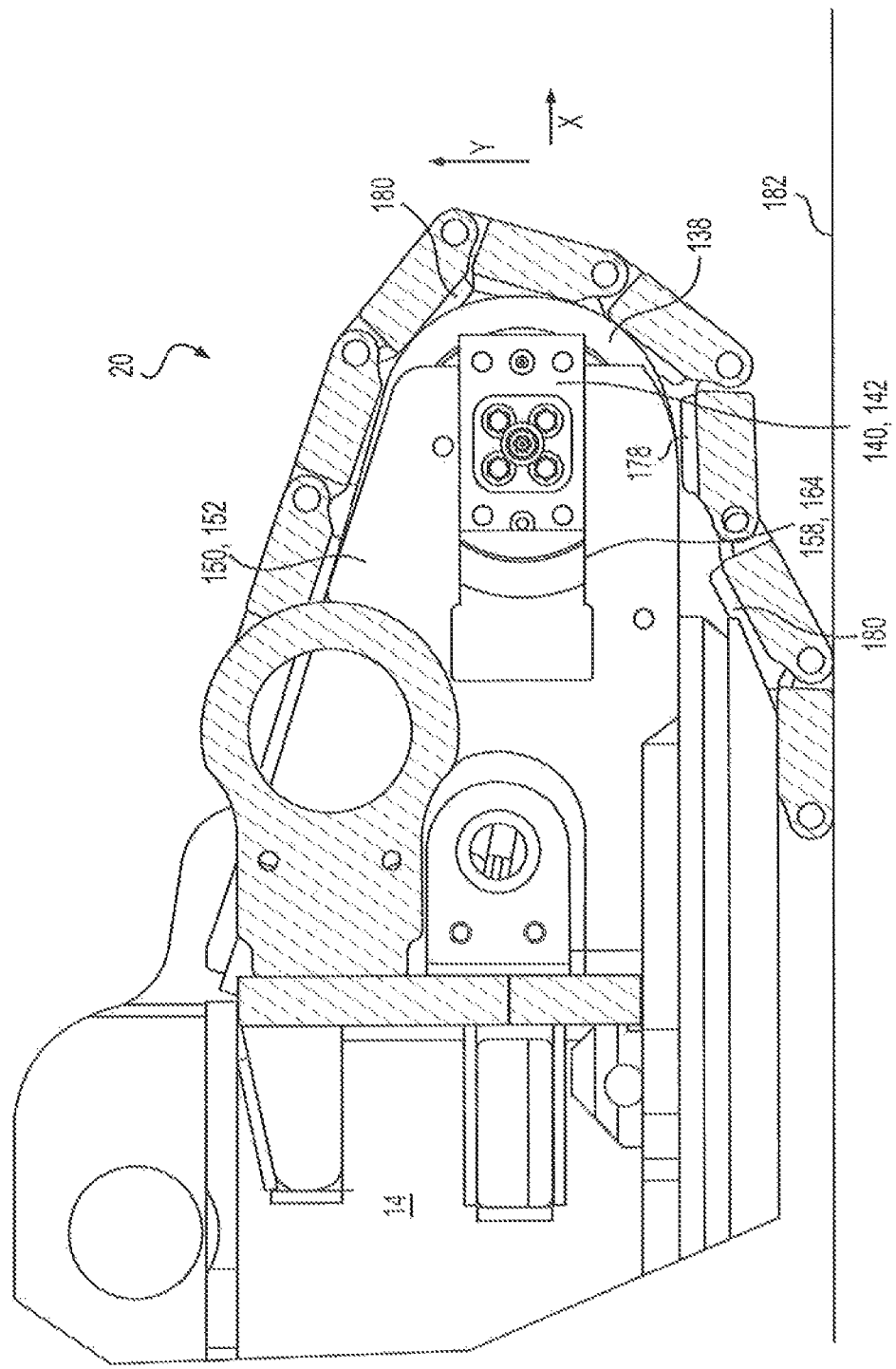
FIG. 7 is a side view of the exemplary disclosed idler assembly of FIG. 5.

FIG. 7 illustrates a side view of an exemplary embodiment of idler assembly 20. As illustrated in FIG. 7, first and second yoke members 150, 152 may be attached to frame 14 of machine 10. In one exemplary embodiment, first and second yoke members 150, 152, may be welded to frame 14. It is contemplated, however, that first and second yoke members 150, 152 may be attached to frame 14 using fasteners, rivets, or any other type of attachment known in the art. As also illustrated in FIG. 7, first and second slots 158, 164 may constrain first and second slide blocks 140, 142, respectively, from moving in a direction "Y" perpendicular to working surface 182. First and second slots 158, 164, however, may allow first and second slide blocks 140, 142, respectively to move in a longitudinal direction X along track chain 16 (in a direction defined by first and second slots 158, 164) such that idler wheel 138 may be biased outward against track chain 16 by a biasing member (not shown), for example a spring, a hydraulic actuator, etc. Link members 56 of track chain 16 may go over and around idler wheel 138. Rails 180 of link members 56 may slidingly engage with first and second circumferential grooves 174, 176 (see FIG. 6) of idler wheel 138. Although only one rail 180 of each link member 56 is visible in FIG. 7, one of ordinary skill in the art would recognize that each link member 56 may have one or more additional rails 180. Allowing rails 180 to engage with first and second circumferential grooves 174, 176 may help guide link members 56 over idler wheel 138, which may help prevent track chain 16 from slipping off idler wheel 138 during operation of machine 10. Guiding rails 180 using first and second circumferential grooves 174, 176 of idler wheel 138 may also help prevent formation of slack in track chain 16.

Figure 8:
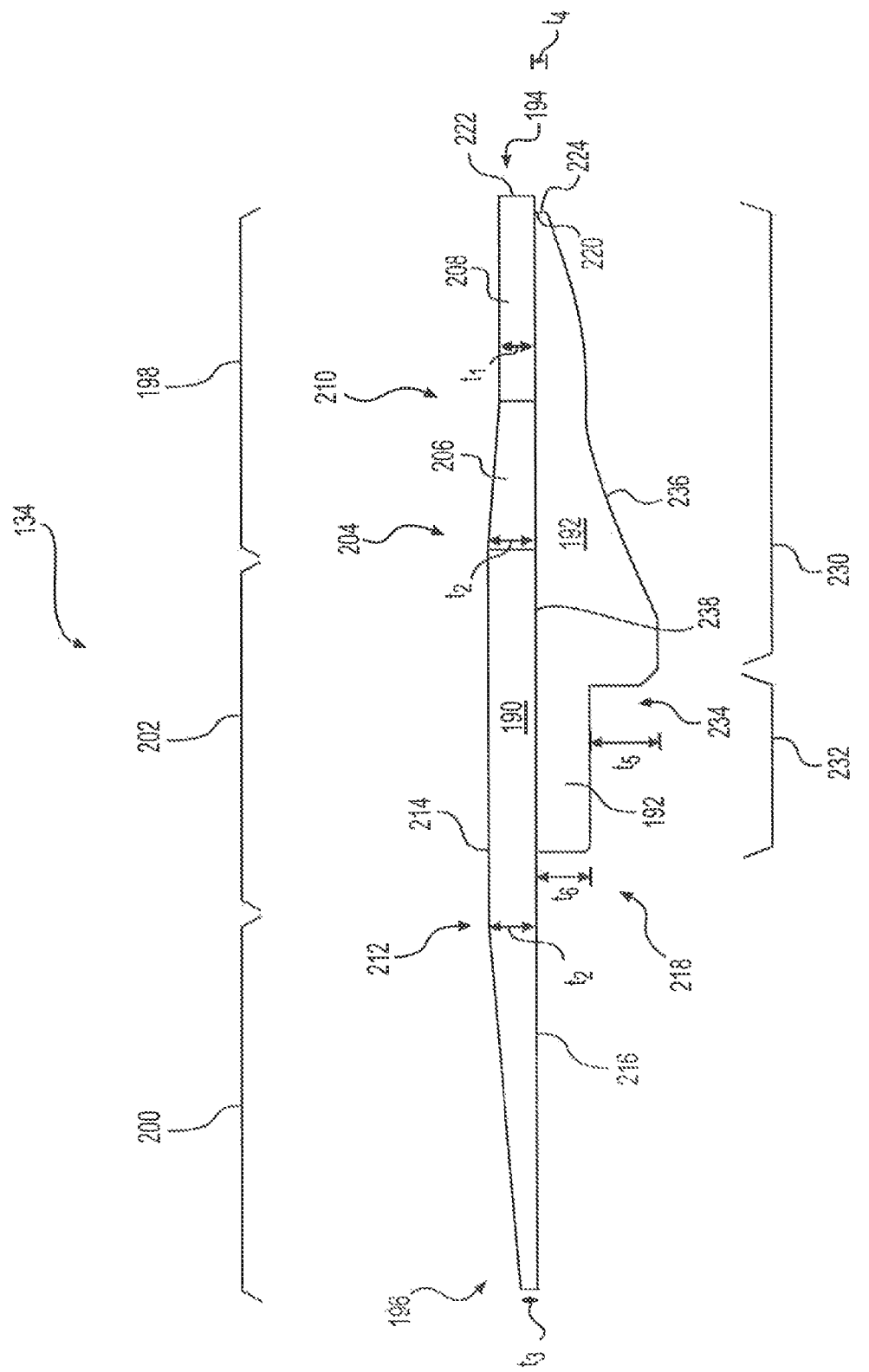
FIG. 8 is a side view of an exemplary disclosed upper transition assembly for the idler assembly of FIG. 5.

FIG. 8 illustrates a side view of an exemplary embodiment of upper transition assembly 134. Upper transition assembly 134 may include an upper spacer plate 190 and a lower spacer plate 192. Lower spacer plate 192 may be welded to upper spacer plate 190. It is contemplated, however, that lower spacer plate 192 may be attached to upper spacer plate 190 via fasteners, rivets, or any other type of attachment known in the art. Upper spacer plate 190 may extend from a first spacer end 194 to a second spacer end 196. Upper spacer plate 190 may have a leading edge portion 198, a trailing edge portion 200, and an intermediate portion 202. Leading edge portion 198 may extend from first spacer end 194 to first distal end 204 disposed between first spacer end 194 and second spacer end 196. Leading edge portion 198 may have a base portion 206 and a projection 208. Base portion 206 may extend from first distal end 204 to second distal end 210 disposed between first spacer end 194 and first distal end 204. Projection 208 may extend from first spacer end 194 to second distal end 210. Projection 208 may have a generally uniform thickness "$t_1$." Base portion 206 may have a thickness $t_1$ adjacent second distal end 210 and a thickness "$t_2$" adjacent first distal end 204. Thickness $t_2$ may be the same as or different from thickness $t_1$.

Trailing edge portion 200 may extend from second spacer end 196 to third distal end 212 disposed between first distal end 204 and second spacer end 196. Upper spacer plate 190 may have an upper surface 214 and a generally flat lower surface 216. Upper surface 214 may be disposed at an angle relative to lower surface 216 between third distal end 212 and second spacer end 196 to form a generally wedge shaped trailing edge portion 200. Wedge shaped trailing edge portion 200 may have thickness "$t_2$" at third distal end 212 and a thickness "$t_3$" at second spacer end 196. Thickness $t_3$ may be smaller than thicknesses $t_1$ and/or $t_2$. Intermediate portion 202 may extend from first distal end 204 to third distal end 212 and may have a generally uniform thickness between first and third distal ends 204, 212. In one exemplary embodiment, intermediate portion 202 may have a thickness equal to a thickness $t_2$.

Figure 9:
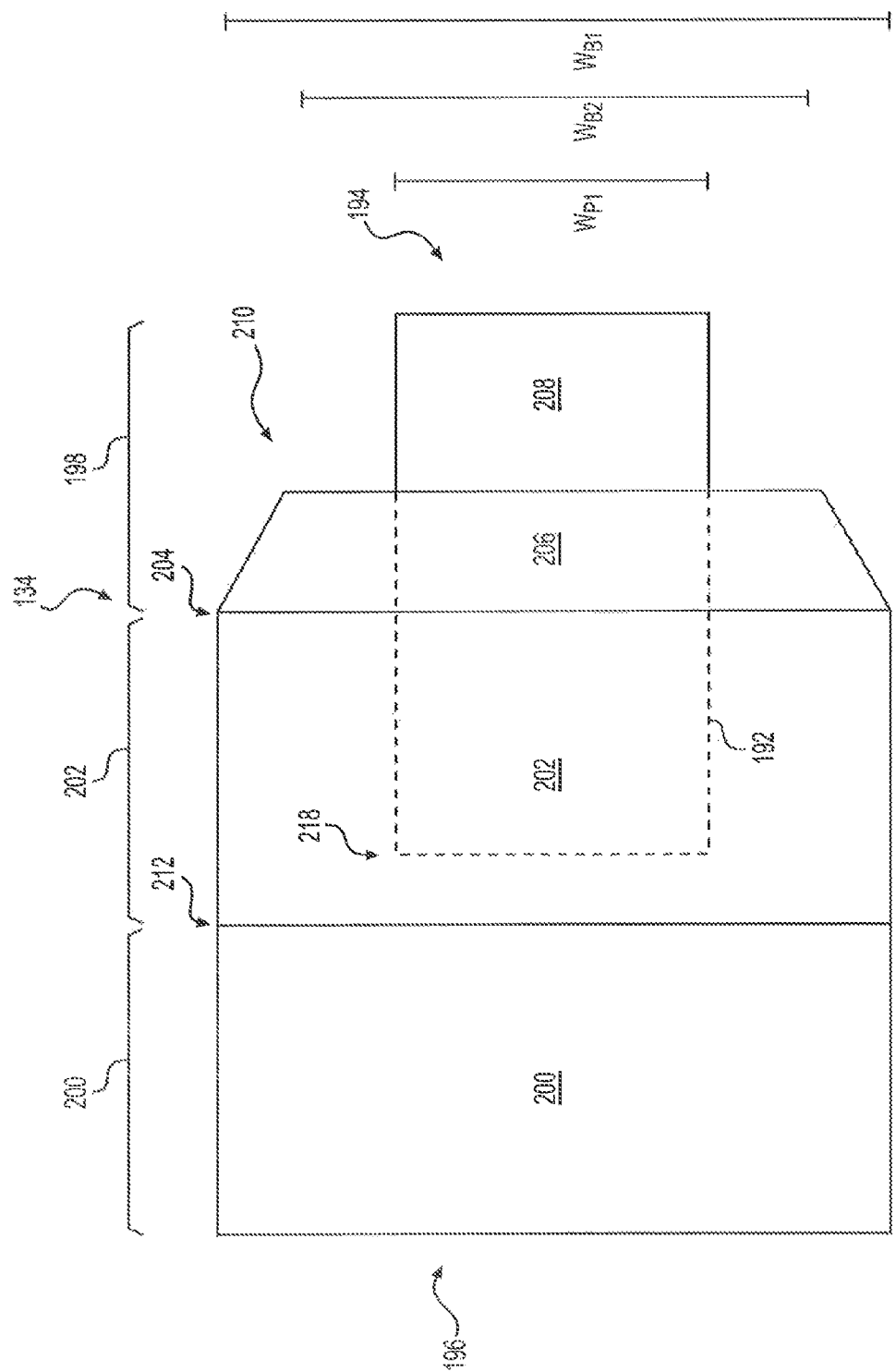
FIG. 9 is a top view of the exemplary disclosed upper transition assembly of FIG. 8.

FIG. 9 illustrates a top view of an exemplary embodiment of upper transition assembly 134. As illustrated in FIG. 9, projection 208 may have a width "$WP_1$." In one exemplary embodiment width $WP_1$ may be smaller than third width $WG_3$ of third circumferential groove 178 of idler wheel 138, which may allow projection 208 to be slidingly disposed in third circumferential groove 178 of idler wheel 138 (see FIG. 5). Allowing projection 208 to be disposed in third circumferential groove 178 of idler wheel 138 may help guide link members 56 away from idler wheel 138, preventing accumulation of slack in track chain 16 near idler wheel 138. Reducing accumulation of slack in track chain 16 adjacent to idler wheel 138 may help ensure that track chain 16 does not break or slip off idler wheel 138 during operation of machine 10.

Base portion 206 may have a width "$WB_1$" adjacent first distal end 204 and a width "$WB_2$" adjacent second distal end 210. Width $WB_2$ may be the same as or different from width $WB_1$. Intermediate portion 202 and trailing edge portion 200 of upper spacer plate 190 may have widths, which may be the same as or different from width $WB_1$ of base portion 206. As also illustrated by the dashed lines in FIG. 9, lower spacer plate 192 may have a width about equal to a width $WP_1$ of projection 208. As used in this disclosure the terms "about equal" indicate that the dimensions a in question differ at most by the manufacturing tolerances associated with those dimensions. Upper spacer plate 190 may be attached to frame 14 of machine 10 adjacent second spacer end 196 via welded joints, fasteners, or any other type of attachment known in the art (see FIG. 5).

Returning to FIG. 8, lower spacer plate 192 may extend from adjacent first spacer end 194 to fourth distal end 218 disposed between first spacer end 194 and third distal end 212. In one exemplary embodiment, as illustrated in FIG. 8, lower spacer plate 192 may have a lower plate leading edge 220 disposed away from upper plate leading edge 222 of upper spacer plate 190 to form a shelf 224. Lower spacer plate 192 may have a front portion 230 and a rear portion 232. Front portion 230 may extend from adjacent first spacer end 194 to fifth distal end 234 disposed between first spacer end 194 and fourth distal end 218. Rear portion 232 may extend from fourth distal end 218 to fifth distal end 234. Front portion 230 may have a thickness "$t_4$" at lower plate leading edge 220 adjacent first spacer end 194 and a thickness "$t_5$" adjacent fifth distal end 234. In one exemplary embodiment, as illustrated in FIG. 8, thickness $t_4$ may be smaller than thickness $t_5$. Further, lower spacer plate 192 may have a curvilinear bottom surface 236 extending between lower plate leading edge 220 and fifth distal end 234. Rear portion 232 of lower spacer plate 192 may have a generally uniform thickness "$t_6$." Thickness $t_6$ may be the same as or different from thickness $t_4$ and/or thickness $t_5$. Lower spacer plate 192 may also have a generally flat upper surface 238, which may abut lower surface 216 of upper spacer plate 190.

Figure 10:
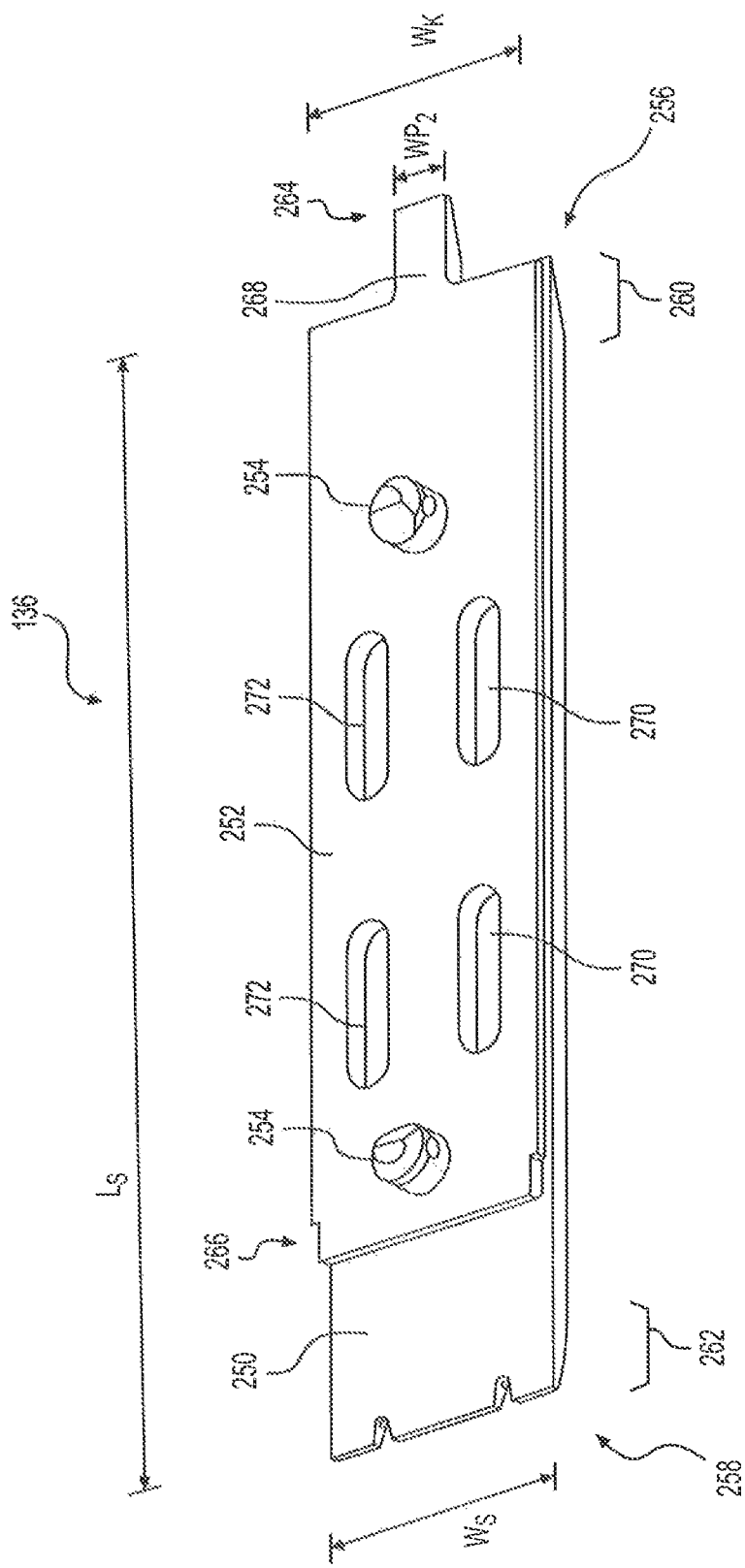
FIG. 10 is a pictorial illustration of an exemplary disclosed wear shoe assembly for the idler assembly of FIG. 5.

FIG. 10 illustrates an exemplary embodiment of wear shoe assembly 136 of machine 10. Wear shoe assembly 136 may include wear shoe 250, lift kit 252, and pins 254. Wear shoe 250 may include a plate member extending from wear shoe front end 256 to wear shoe rear end 258. Wear shoe 250 may have a generally uniform thickness "$t_{WS}$", a front wear shoe transition 260 and a rear wear shoe transition 262. Wear shoe may have a first length "$L_S$" and a first width "$W_S$." Lift kit 252 may extend from a lift kit front end 264 to a lift kit rear end 266, which may be disposed between wear shoe front end 256 and wear shoe rear end 258. Lift kit may have a width "$W_K$," which may be the same as or different from width $W_S$ of wear shoe 250. Lift kit 252 may have a generally uniform thickness "$t_{LK}$," which may be the same as or different from thickness $t_{WS}$ of wear shoe 250. Lift kit 252 may also include a lift kit projection 268, and one or more slots 270. Lift kit projection 268 may extend from lift kit front end 264 to wear shoe front end 256. Lift kit projection 268 may have a width "$WP_2$," which may be smaller than width $W_S$ and/or $W_K$. In one exemplary embodiment, width $WP_2$ may be smaller than a third width $WG_3$ of third circumferential groove 178 of idler wheel 138, allowing lift kit projection 268 to be slidingly received in third circumferential groove 178 of idler wheel 138 (see FIG. 5). Allowing lift kit projection 268 to be received into third circumferential groove 178 of idler wheel 138 may help guide link members 56 towards idler wheel 138 reducing accumulation of slack in track chain 16 near idler wheel 138. Reducing accumulation of slack adjacent to idler wheel 138 may help ensure that track chain 16 does not break or slip off idler wheel 138 during operation of machine 10.

Slots 270 may be generally elongated slots 270 disposed on lift kit 252. It is contemplated, however, that slots 270 may have a circular, elliptical, square, rectangular, polygonal, or any other shape known in the art. Slots 270 may extend through thickness $t_{LK}$ of lift kit 252. Lift kit 252 may be attached to wear shoe 250 via welded joints disposed around an inner periphery 272 of slots 270. It is contemplated, however, that lift kit 252 may be attached to wear shoe 250 via fasteners, rivets, or any other method of attachment known in the art. Pins 254 may be fixedly connected to lift kit 252 and may be configured to attach wear shoe assembly 136 to frame 14 of machine 10.

Figure 11:
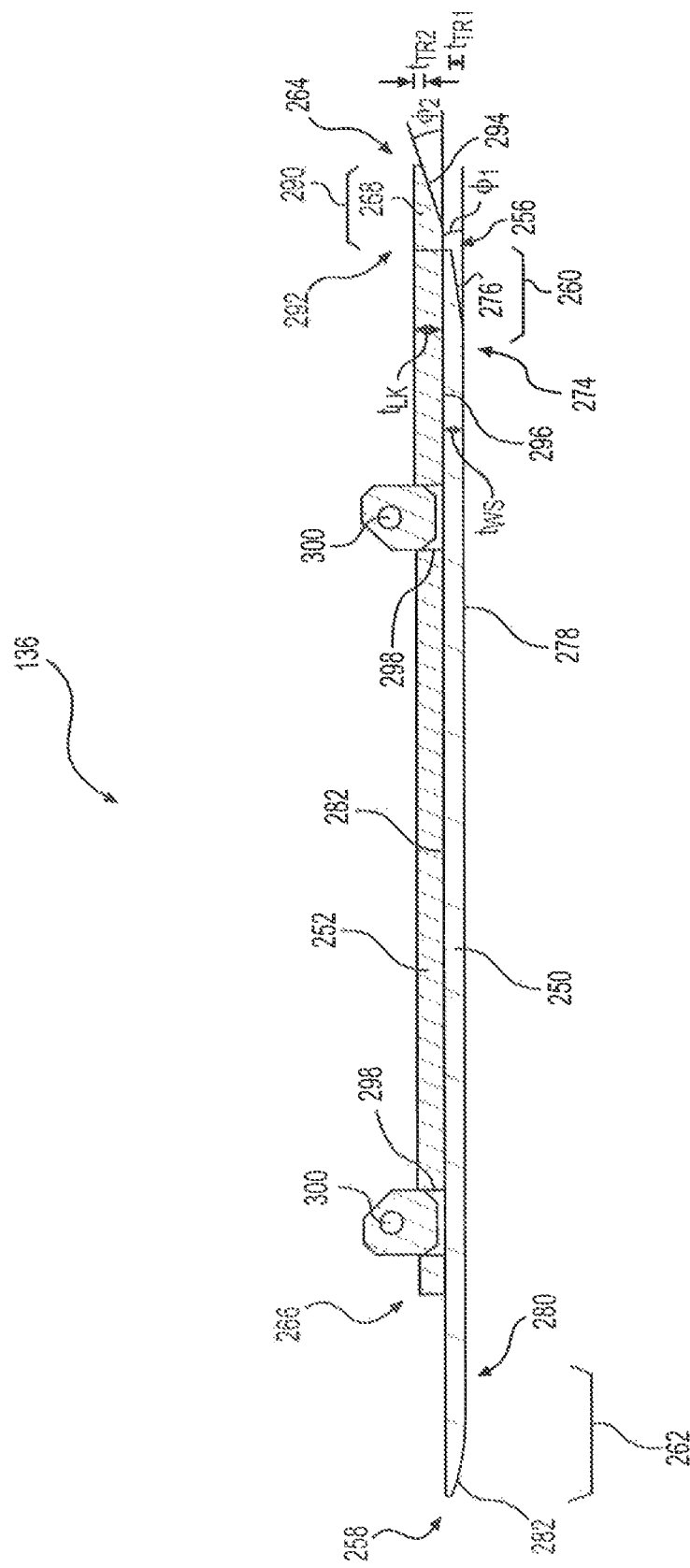
FIG. 11 is a cut-away side view of the exemplary disclosed wear shoe assembly of FIG. 10.

FIG. 11 shows a side view of an exemplary embodiment of wear shoe assembly 136. As illustrated in FIG. 11, front wear shoe transition 260 may extend from wear shoe front end 256 to a sixth distal end 274 disposed between wear shoe front end 256 and wear shoe rear end 258. Front wear shoe transition 260 may have a wedge shape. For example, wear shoe 250 may have a first thickness "$t_{TR1}$" at wear shoe front end 256 and thickness $t_{WS}$ at sixth distal end 274. In one exemplary embodiment, as illustrated in FIG. 11, thickness $t_{TR1}$ may be smaller than thickness $t_{WS}$. Front wear shoe transition 260 may have an inclined bottom face 276, which may be disposed at an angle $\phi_1$ relative to wear shoe bottom surface 278. Rear wear shoe transition 262 may extend from wear shoe rear end 258 to a seventh distal end 280 disposed between wear shoe rear end 258 and sixth distal end 274. Wear shoe bottom surface 278 may intersect wear shoe top surface 282 via a generally curvilinear surface 284 of rear wear shoe transition 262.

Lift kit 252 may have a lift kit transition 290, which may extend from lift kit front end 264 to eighth distal end 292 disposed between lift kit front end 264 and wear shoe front end 256. Lift kit transition 290 may also have a wedge shape. For example, lift kit 252 may have a thickness $t_{TR2}$ at lift kit front end 264 and thickness $t_{LK}$ at eighth distal end 292. In one exemplary embodiment, as illustrated in FIG. 11, thickness $t_{TR2}$ may be smaller than thickness $t_{LK}$. Lift kit transition 290 may have an inclined bottom face 294, which may be disposed at an angle $\phi_2$ relative to lift kit bottom surface 296. In one exemplary embodiment, angle $\phi_1$ may be about equal to angle $\phi_2$. In another exemplary embodiment, angles $\phi_1$ and $\phi_2$ may each range between 14 to 16°. As also illustrated in FIG. 11, lift kit bottom surface 296 may abut wear shoe top surface 282.

Lift kit 252 may also have one or more holes 298. Holes 298 may be generally cylindrical in shape. It is contemplated, however, that holes 298 may be elliptical, square, polygonal, or may have any other shape known in the art. Pins 254 may have a shape corresponding to a shape of holes 298. Pins 254 may engage with holes 298 via an interference fit. In one exemplary embodiment, pins 254 may be inserted into holes 298 and welded to lift kit 252. Each pin 254 may also have a lock pin hole 300, configured to receive a locking pin (not shown). Pins 254 may be configured to pass through correspondingly located openings (not shown) in frame 14 of machine 10. Wear shoe assembly 136 and/or lift kit 252 may be attached to frame 14, by inserting locking pins in lock pin holes 300 of pins 254 after inserting pins 254 through corresponding openings in frame 14. It is contemplated however, that wear shoe assembly 136 may be attached to frame 14 via fasteners, rivets, welded joints, or by any other type of attachment known in the art.

Figure 12:
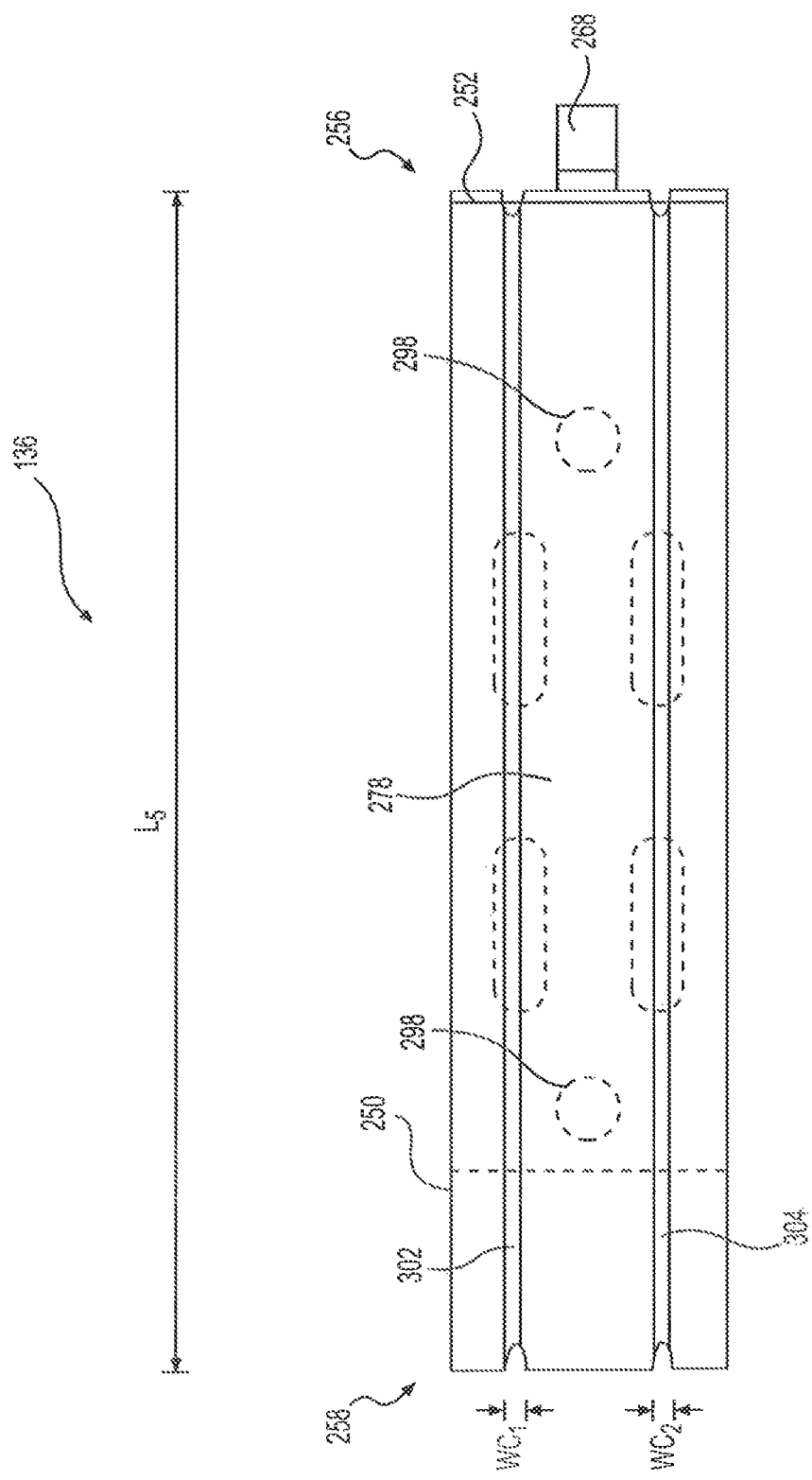
FIG. 12 is a bottom view of the exemplary disclosed wear shoe assembly of FIG. 11.

FIG. 12 illustrates a bottom view of an exemplary embodiment of wear shoe assembly 136. As illustrated in FIG. 12, wear shoe 250 may have a first channel 302 disposed on wear shoe bottom surface 278 of wear shoe 250. First channel 302 may extend along length $L_S$ of wear shoe 250 from wear shoe front end 256 to wear shoe rear end 258. First channel 302 may have a first channel width "$WC_1$" and a first channel depth "$WD_1$." Wear shoe 250 may also have a second channel 304 disposed on wear shoe bottom surface 278 of wear shoe 250. Second channel 304 may extend along length $L_S$ of wear shoe 250 from wear shoe front end 256 to wear shoe rear end 258. Second channel 304 may be spaced apart from first channel 302 along a width of wear shoe 250. Second channel 304 may have a second channel width "$WC_2$" and a second channel depth "$WD_2$." First and second channel widths $WC_1$ and $WC_2$ may be the same or different. Likewise, first and second channel depths $WD_1$ and $WD_2$ may be the same or different. First and second channels 302, 304 may be configured to slidingly receive rails 180 of link members 56 during operation of machine 10. First and second channels 302, 304 may be configured to guide link members 56 towards idler assembly 20. First and second channels 302, 304 may have a rectangular, semi-circular, polygonal or any other type of shape known in the art.

First and second channels 302, 304 may cooperate with first and second circumferential grooves 174, 176 in idler wheel 138 to receive and guide rails 180 of link members 56 to help prevent accumulation of slack in track chain 16 in the vicinity of idler wheel 138. Further, front wear shoe transition 260 of wear shoe 250 and lift kit transition 290 of lift kit 252 may cooperate to guide link members 56 towards or away from working surface 182 to idler wheel 138 to help prevent accumulation of slack in track chain 16. Although FIG. 12 illustrates only a first channel 302 and a second channel 304, it is contemplated that wear shoe 250 may have any number of first and second channels 302, 304. It is also contemplated that wear shoe 250 may have only first channel 302 or second channel 304.

INDUSTRIAL APPLICABILITY

The disclosed sprocket 50, idler wheel 138, upper transition assembly 134, and wear shoe assembly 136 may be implemented in any track-type machine 10 to minimize wear of sprocket wheel 82 and to help reduce generation of slack near idler wheel 138.

Referring to FIGS. 1-4, during operation of machine 10, engine 40 may generate power output, which may be transferred to sprocket 50 via sprocket shaft 52. Sprocket 50 may rotate in a clockwise or counter-clockwise direction in response to the power output from engine 40. When sprocket 50 rotates in a clockwise direction, for example, leading edges 66 of one or more teeth 54 may engage with front pads 60 of one or more link members 56, pushing front pads 60 and causing machine 10 to be propelled in a forward direction. In particular, leading edges 66 may engage with front pads 60 over a relatively large surface area of one or more leading edges 66 as compared to by a line contact, distributing the contact load over the larger surface area and helping to reduce wear of teeth 54 and front pads 60. Rear pads 62 of one or more link members 56 may also engage with second flats 122 over a relatively larger surface area of second flats 122 as compared to by a line contact, distributing the contact load over the larger surface area and helping to reduce wear of second flats 122 and rear pads 62.

When sprocket 50 rotates in a counter-clockwise direction, for example, trailing edges 68 of one or more teeth 54 may engage with rear pads 62 of one or more link members 56, pushing rear pads 62 and causing machine 10 to be propelled in a rearward direction. In particular, trailing edges 68 may engage with rear pads 62 over a relatively large surface area of one or more trailing edges 68 as compared to by a line contact, distributing the contact load over the larger surface area and helping to reduce wear of teeth 54 and rear pads 62. Front pads 60 of one or more link members 56 may also engage with first flats 120 over a relatively larger surface area of first flats 120 as compared to by a line contact, distributing the contact load over the larger surface area and helping to reduce wear of first flats 120 and front pads 60. Reducing wear of front pads 60, rear pads 62, leading edges 66, trailing edges 68, first flats 120, and second flats 122 may help reduce an amount of slack generated in track chain 16, which may in turn help reduce the potential for breakage or slipping off of track chain 16 from sprocket wheel 82 or idler wheel 138.

Referring to FIGS. 5-12, during operation of machine 10, when machine 10 is being propelled forward, upper transition assembly 134 may help guide link members 56 towards idler wheel 138. In particular, projection 208 of upper transition assembly 134 may be slidingly received in third circumferential groove 178 of idler wheel 138. Projection 208 may help guide link members 56 of track chain 16 towards idler wheel 138, minimizing accumulation of slack in track chain 16 near idler wheel 138. Further rails 180 of link members 56 may slidingly engage with first and second circumferential grooves 174, 176 in idler wheel 138. The first and second circumferential grooves 174, 176 may guide rails 180 over idler wheel 138, further helping to minimize accumulation of slack in track chain 16 near idler wheel 138. Lift kit projection 268 may be slidingly received in third circumferential groove 178 of idler wheel 138. Lift kit projection 268 may help guide link members 56 away from idler wheel 138, minimizing accumulation of slack in track chain 16 near idler wheel 138. Rails 180 of link members 56 may exit first and second circumferential grooves 174, 176 of idler wheel 138 and slidingly engage with first and second channels 302, 304, respectively, of wear shoe 250. First and second channels 302, 304 of wear shoe 250 may guide rails 180 of link members 56 away from idler wheel 138, further helping to minimize accumulation of slack in track chain 16 near idler wheel 138. Minimizing accumulation of slack near idler wheel 138 may help reduce the potential for track chain 16 to break and/or slip off idler wheel 138 during operation of machine 10. By guiding link members 56 towards or away from idler wheel 138, upper transition assembly 134 and lift kit projection 268 may also help to reduce an amount of rotation between link members 56 and pivot members 58, which in turn may help reduce an amount of wear of link members 56 and pivot members 58.

When machine 10 is being propelled rearward, upper transition assembly 134 and wear shoe assembly 136 may reverse their roles. For example, when machine 10 is being propelled rearward, first and second channels 302, 304 of wear shoe assembly 136 may guide rails 180 of link members 56 towards idler wheel 138. Further, lift kit projection 268 may help guide track chain 16 towards idler wheel 138, allowing rails 180 to engage with first and second circumferential grooves 174, 176 in idler wheel 138, further helping to reduce the potential for accumulation of slack in track chain 16 near idler wheel 138. Additionally, when machine 10 is being propelled rearward, upper transition assembly 134 may help guide track chain 16 away from idler wheel 138. For example, projection 208 may help guide track chain away from idler wheel 138, helping to reduce the potential for accumulation of slack in track chain 16 near idler wheel 138. Minimizing accumulation of slack near idler wheel 138 may help reduce the potential for track chain 16 to break and/or slip off idler wheel 138 during operation of machine 10.

It will be apparent to those skilled in the art that various modifications and variations can be made to the disclosed sprocket. Other embodiments will be apparent to those skilled in the art from consideration of the specification and practice of the disclosed sprocket. It is intended that the specification and examples be considered as exemplary only, with a true scope being indicated by the following claims and their equivalents.

What is claimed is:

1. A sprocket, comprising:
   a cylindrical hub having a first hub end and a second hub end disposed opposite the first hub end;
   a sprocket wheel disposed on the cylindrical hub between the first hub end and the second hub end;
   a first tooth disposed on the sprocket wheel, the first tooth including
      a first tooth bottom disposed on a root circle that is centered on a rotational axis of the sprocket wheel,
      a first tooth flank extending radially outward from the root circle to an outer surface of the first tooth, and
      a first flat extending from the first tooth bottom at a first generally obtuse angle relative to a radial axis of the first tooth, the first flat adjoining the first tooth bottom on the root circle, the radial axis extending radially outward from the rotational axis of the sprocket wheel; and
   a second tooth disposed on the sprocket wheel adjacent to the first tooth, wherein
      the second tooth includes a second tooth bottom disposed on the root circle, and
      the sprocket wheel further includes a second flat extending from the second tooth bottom at a second generally obtuse angle relative to a radial axis of the second tooth, the second flat intersecting with the first flat.

2. The sprocket of claim 1, wherein the second tooth bottom is spaced apart from the first tooth bottom.

3. The sprocket of claim 2, wherein the first tooth flank includes a leading edge extending from the first tooth bottom to the outer surface, and a trailing edge extending from the second tooth bottom to the outer surface.

4. The sprocket of claim 3, wherein the leading edge and the trailing edge each have a generally curved shape.

5. The sprocket of claim 2, wherein the first generally obtuse angle and the second generally obtuse angle are about equal.

6. The sprocket of claim 2, wherein the first flat has a first width, the second flat has a second width, and the first width is about equal to the second width.

7. The sprocket of claim 2, wherein the first flat has a first width, the second flat has a second width, and the first width is greater than the second width.

8. The sprocket of claim 1, wherein the sprocket wheel is disposed closer to the first hub end than the second hub end.

9. The sprocket of claim 1, wherein the cylindrical hub includes a generally cylindrical bore configured to receive a sprocket shaft.

10. The sprocket of claim 1, wherein the sprocket wheel includes seven teeth.

11. The sprocket of claim 1, wherein the first generally obtuse angle is about 91.5°.

12. The sprocket of claim 1, wherein a width of the first flat is about equal to a width of the second flat.

13. The sprocket of claim 12, wherein the first generally obtuse angle is about equal to the second generally obtuse angle.

14. The sprocket of claim 1, wherein the first tooth bottom tangentially intersects the root circle, and the second tooth bottom tangentially intersects the root circle.

15. The sprocket of claim 1, wherein an outer surface of the first tooth defines an outermost diameter of the sprocket wheel,
   the radial axis is orthogonal to the outer surface at the outermost diameter of the sprocket wheel, and
   the radial axis divides the first tooth flank into two substantially equal half portions.

16. A track assembly, comprising:
   a plurality of link members forming a track chain;
   an idler wheel disposed at a front end of the track chain; and
   a sprocket disposed at a rear end of the track chain opposite the front end, the sprocket being configured to propel the track chain,
   the sprocket including a sprocket wheel and at least one tooth disposed on the sprocket wheel, the at least one tooth including a first tooth disposed adjacent to a second tooth, the first tooth including
      a first tooth bottom disposed on a root circle that is centered on a rotational axis of the sprocket wheel,
      a first tooth flank extending radially outward from the root circle to an outer surface of the first tooth, and
      a first flat extending from the first tooth bottom at a first generally obtuse angle relative to a radial axis of the first tooth, the first flat adjoining the first tooth bottom on the root circle, the radial axis extending radially outward from the rotational axis of the sprocket wheel,
   wherein the second tooth includes a second tooth bottom disposed on the root circle, and
   wherein the sprocket wheel further includes a second flat extending from the second tooth bottom at a second generally obtuse angle relative to a radial axis of the second tooth, the second flat intersecting with the first flat.

17. The track assembly of claim 16, wherein the first tooth bottom tangentially intersects the root circle, and the second tooth bottom tangentially intersects the root circle.

18. A machine, comprising:
   a frame;
   an engine supported by the frame;
   a plurality of link members forming a track chain;
   an idler wheel attached to the frame and disposed at front end of the track chain;
   a sprocket attached to the frame and disposed at a rear end of the track chain opposite the front end, the sprocket being configured to be driven by the engine; and
   a plurality of teeth disposed on the sprocket, each tooth of the plurality of teeth including
      a first tooth bottom disposed on a root circle that is centered on a rotational axis of the sprocket,
      a second tooth bottom disposed on the root circle, the second tooth bottom being spaced apart from the first tooth bottom, a tooth flank extending radially outward from the root circle to an outer surface of the tooth, a first flat extending from the first tooth bottom at a first generally obtuse angle relative to a radial axis of the tooth, the first flat adjoining the first tooth bottom on the root circle, the radial axis extending radially outward from the rotational axis of the sprocket, and a second flat extending from the second tooth bottom at a second generally obtuse angle relative to the radial axis, wherein an outer surface of each tooth defines an outermost diameter of the sprocket, the radial axis is orthogonal to the outer surface at the outermost diameter of the sprocket, and the radial axis divides the tooth flank into two substantially equal half portions.

\* \* \* \* \*